United States Patent [19]

Kazewych

[11] 4,237,657
[45] Dec. 9, 1980

[54] AUTOMOTIVE TAPE DRIVE WINDOW REGULATOR

[75] Inventor: Bohdan Kazewych, Union Lake, Mich.

[73] Assignee: General Motors Corporation, Detroit, Mich.

[21] Appl. No.: 56,904

[22] Filed: Jul. 12, 1979

[51] Int. Cl.³ .............................................. E05F 11/48
[52] U.S. Cl. ......................................... 49/352; 49/375
[58] Field of Search ................... 49/352, 374, 375, 348

[56] References Cited

U.S. PATENT DOCUMENTS

| | | | |
|---|---|---|---|
| 1,627,697 | 5/1927 | Fredericks | 49/352 |
| 2,261,482 | 11/1941 | Myers | 49/348 |
| 3,035,829 | 5/1962 | Stotz | 49/341 |
| 3,228,677 | 1/1966 | Martens | 49/349 X |
| 3,280,509 | 10/1966 | Werner | 49/352 |
| 3,427,748 | 2/1969 | Marr | 49/352 |
| 3,702,041 | 11/1972 | Podolan | 49/348 |
| 3,897,654 | 8/1975 | Kouth | 49/352 |
| 3,930,339 | 1/1976 | Jander | 49/352 |
| 4,004,371 | 1/1977 | Podolan et al. | 49/352 |

Primary Examiner—Kenneth Downey
Attorney, Agent, or Firm—R. L. Phillips

[57] ABSTRACT

A connector device for attaching the tape in an automotive window regulator to the window comprising a drive block which engages the tape and snap locks to a guide block which also retains the drive block in engagement with the tape, and a sash plate which is fixable to the window and twist locks to the guide block.

3 Claims, 7 Drawing Figures

AUTOMOTIVE TAPE DRIVE WINDOW REGULATOR

This invention relates to an automotive tape drive window regulator and more particularly to a connector device for drivingly connecting the tape in such a regulator to the window.

Automotive tape drive window regulators have certain advantages over the linkage type such as in cost, weight, space savings and simplicity of manufacture and assembly. The present invention is directed to furthering certain of these advantages and in particular improving on the manner in which the tape is drivingly connected to operate the window by drive and guide blocks of the type disclosed in co-pending U.S. Patent Application Ser. No. 960,737 assigned to the assignee of the present invention.

In U.S. Patent Application Ser. No. 960,737, the drive block engages the tape and snap locks to a guide block which is slidably mounted on the channel track in which the tape slides. The guide block retains the drive block in engagement with the tape and is connected by a sash plate to the window. In the drive connection arrangement between the drive and guide blocks, a resilient locking arm integral with the drive block is utilized to provide the snap lock action as well as the drive connection between the blocks in both directions of tape movement.

According to the present invention, there is provided an improved drive connection arrangement between the drive and guide blocks which utilizes the resilient arm but is not totally dependent thereon for either locking or drivingly connecting the blocks and maintaining the drive block engaged with the tape. Instead, the resilient arm snaps into a position of drive engagement with the drive block as the blocks are slidably engaged with each other during assembly thereof to thereby effect a drive connection therebetween that is operable when the tape is slid in one direction in the track. On the other hand, a rigid projection is newly provided on the drive block for engaging with the guide block to effect drive connection therebetween that is operable when the tape is slid in the opposite direction. Then in addition, both of the blocks are provided with an interlocking arrangement which engages to prevent disengagement of the drive connections provided by the resilient drive arm and the rigid drive projections and maintain the blocks in their assembled condition. With this drive and interlocking arrangement, it has been found that substantially larger tolerance stack-up conditions are allowable in the manufacture of the drive and guide blocks with the interlocking action remaining effective to maintain drive connection therebetween even when the resilient drive arm incurs substantial set because of its drive function.

These and other objects of the present invention will be more apparent from the following description and drawing in which.

Figure 1:
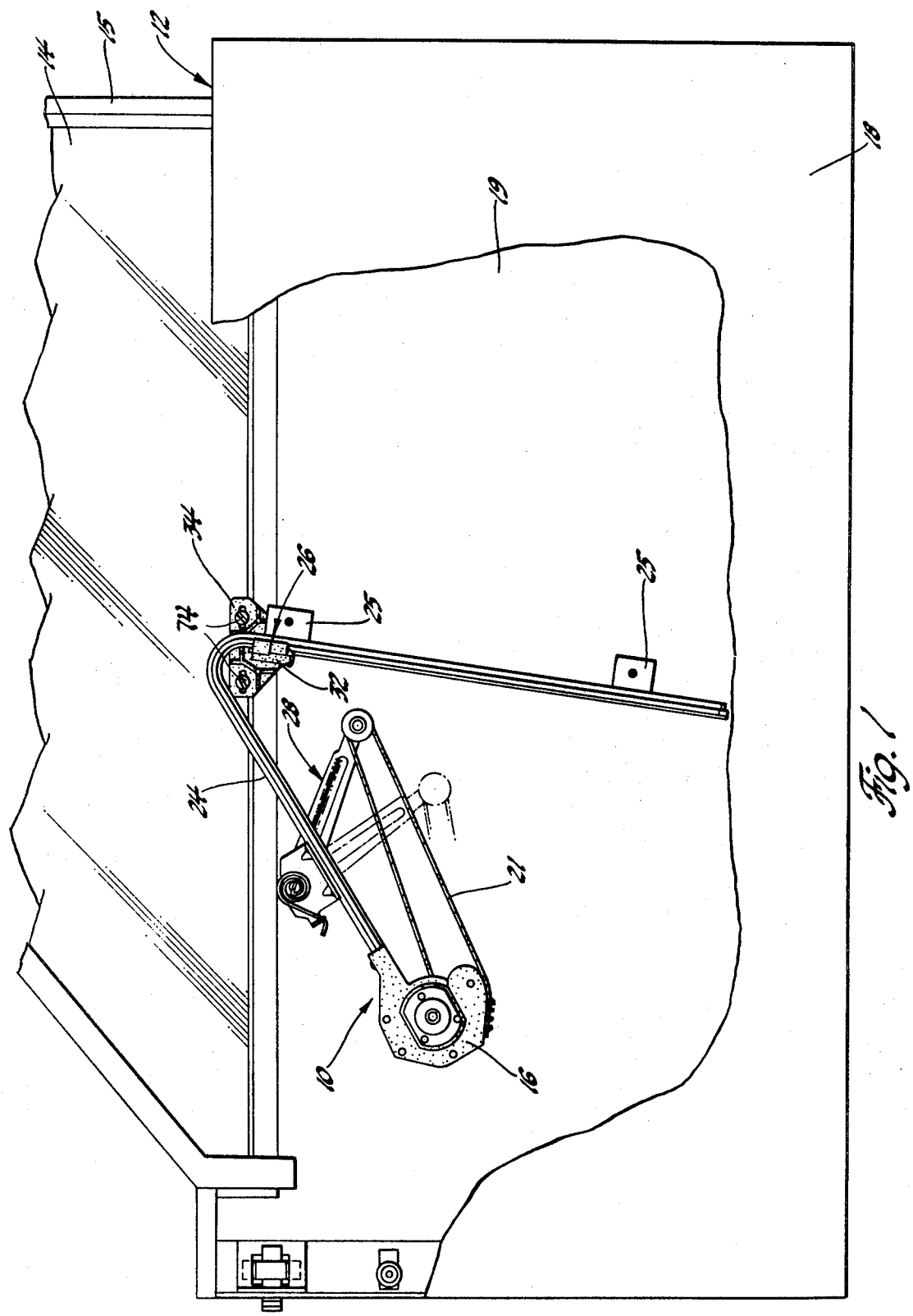
FIG. 1 is a side view of an automobile door with the inner panel broken away to illustrate a window regulator having an improved connector device between the tape and window according to the present invention.

The invention is shown in use in an automotive window regulator 10 of the type disclosed in U.S. Patent Application Ser. No. 921,729 filed July 3, 1978 in the name of Juozas Doveinis and assigned to the assignee of this invention and which is hereby incorporated by reference. The window regulator 10 is mounted in an automobile door 12 and is operable to open and close a window pane 14 with respect to a window opening defined by the belt line of the door and the vehicle body, not shown. The window has a frame 15 by which it is guided in the door and the window regulator 10 generally comprises an actuator 16 which is mounted between the door's inner and outer panels 18 and 19 in the forward half thereof and with the actuator fixed to the inner panel.

The actuator includes a sprocket 20 which engages and drives a perforated plastic tape 21 having perforations 22 spaced along the length thereof. The tape 21 is slidably mounted in a channel track 24 that is fixed to the inner door panel 18 at the actuator 16 and by a pair of brackets 25. The tape 21 is connected to the window 14 at a midpoint near the bottom edge thereof by a connector device 26 according to the present invention. A swing arm counterbalance device 28 operatively connected to the tape maintains the latter taut and counterbalances the weight of the window as it is moved by operation of the actuator 16. The structure thus far described except for portions of the connector device 26 is disclosed and described in detail in the aforementioned Doveinis application to which reference may be made for a more complete understanding thereof.

Figure 4:
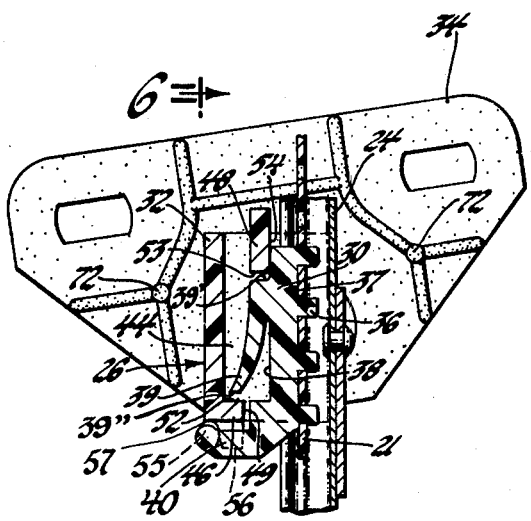
FIG. 4 is a view taken along the line 4—4 in FIG. 3.
Figure 5:
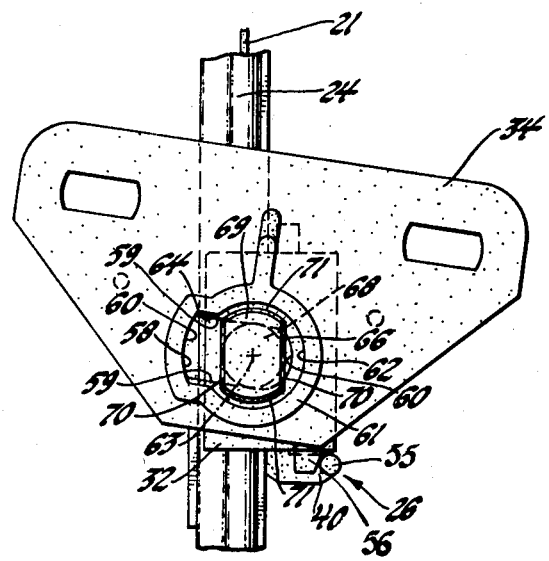
FIG. 5 is a view taken along the line 5—5 in FIG. 3.
Figure 6:
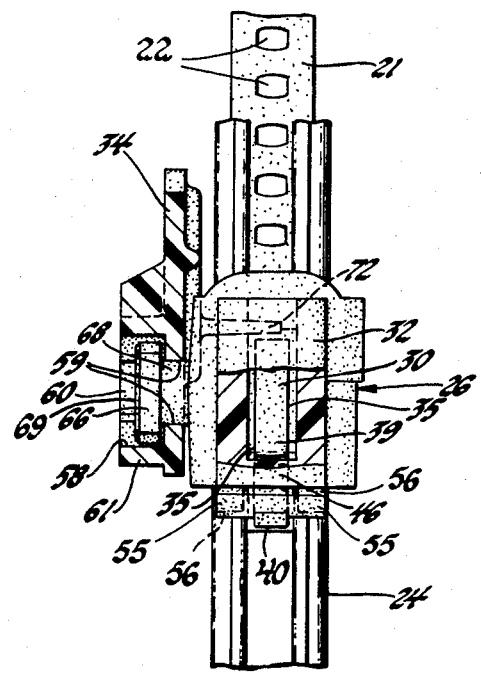
FIG. 6 is a view taken along the line 6—6 in FIG. 4.
Figure 7:
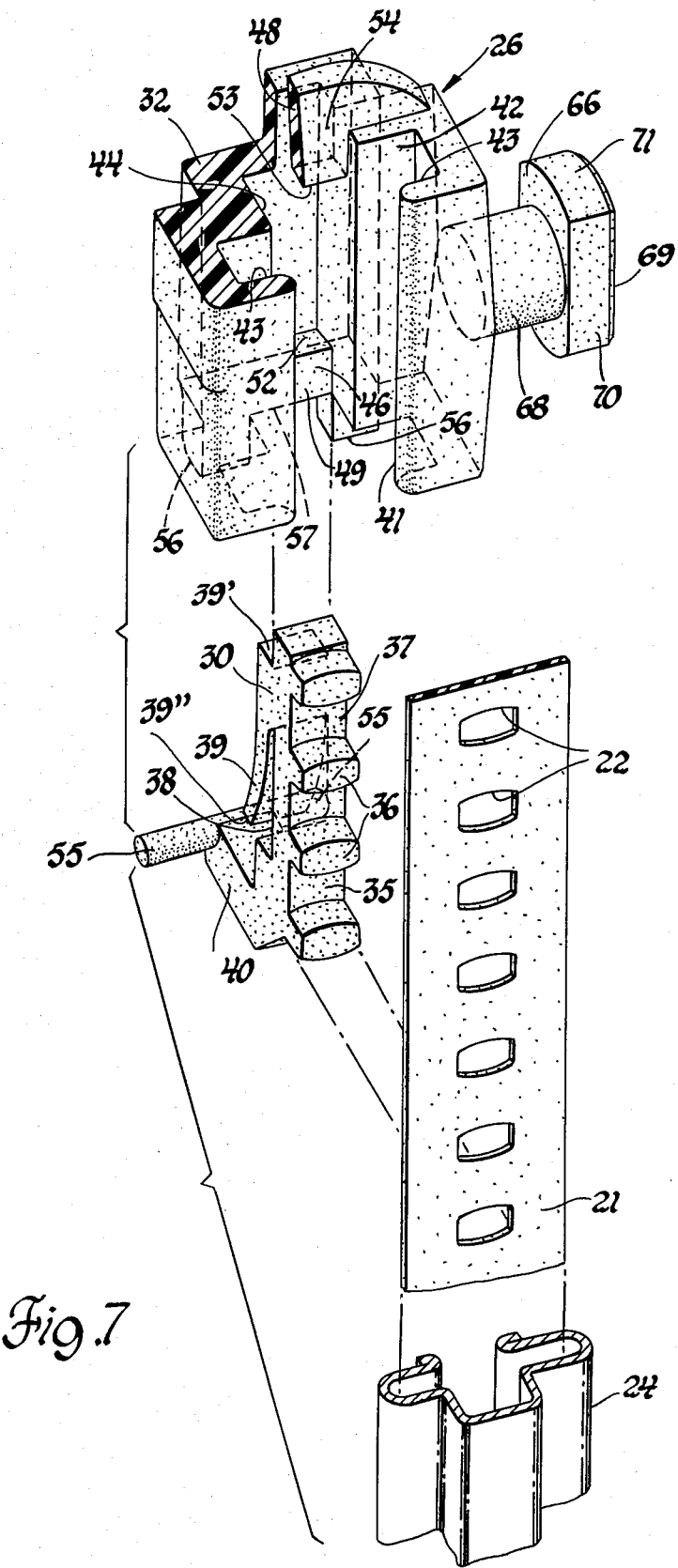
FIG. 7 is an exploded view of the connector device in the above figures.

Referring to FIGS. 3 through 7, the connector device 26 between the tape and the window comprises three interlocking parts; namely, a drive block 30, guide block 32 and sash plate 34. All these connector parts are molded hard plastic one-piece parts and interlock so as to be positively connected without need of any threaded fasteners and the like. The drive block 30 has parallel flat sides 35 extending through the open side of the channel track 24 and one or more projections or teeth 36, in this case four, projecting from an inwardly facing side 37 thereof which engage the perforated tape 21. As seen in FIGS. 6 and 7, the tape perforations 22 and the tape engaging surface of the drive block teeth 36 have corresponding elliptical shapes which minimizes stress concentrations in these parts and particularly in the tape. An outwardly facing side 38 of the drive block 30 opposite the inwardly facing side 37 has a resilient drive arm 39 projecting outward and downward therefrom and in addition, has a projecting drive foot 40 on the same side opposite the end of the arm. The guide block 32 has a longitudinal opening 41 in one side thereof opening to a longitudinal slide channel 42 parallel therewith having a pair of oppositely facing slots 43 for slidably mounting the block guide on the outside of the channel track 24. In addition, the guide block 32 has a longitudinal channel 44 which is open and parallel to the slide channel 42 and closely receives the flat sides 35 of the drive block 30 while the latter is engaged with the tape. The guide block 32 is also formed with a pair of transversely extending wall portions 46 and 48 which extend across opposite ends of channel 44. The lower wall 46 has a surface 49 forming a projecting portion on the back of the channel which is engaged by and deflects the drive arm 39 as the drive block 30, while engaging the tape 21, is moved upward as viewed in FIG. 4 into the channel 44 by pushing on the drive foot 40 after the guide block 32 has been slidably mounted on the channel track 24. The transverse walls 46 and 48 have oppositely facing sides 52 and 53, respectively, which are spaced apart a distance slightly longer than the length of drive arm 39 so that as the drive block is continued to be pushed upward with its thus deflected arm, the drive arm eventually snaps into the space past the wall 46 and between the sides 52 and 53 while side 54 of the other wall 48 is engaged by the side 38 of the drive block 30 to hold its teeth 36 engaged with the tape with the cooperation of side 49 of wall 46 at the other end of the guide block.

As the resilient drive arm 39 snaps into place, a pair of rigid projections 55 formed integral with the end of the drive foot 40 slide into engagement with a pair of shoulders 56 formed integral with the lower end 57 of guide block 32. The drive block projections 55 are aligned with each other and extend in opposite directions from and transverse to the drive block foot 40 which fits between the guide block shoulders 56. The shoulders 56, on the other hand, extend parallel to each other and downwardly from the lower end 57 of the guide block and the drive block projections 55 engage the sides of the shoulders which face away from the drive block. As seen in FIGS. 4 and 6, the clearance between the shoulder 39' and free end 39" of the drive arm 39 and the oppositely facing sides 52 and 53 of the drive block is larger than that between the drive block wall 46 and the free end 39" of the drive arm 39 and drive foot 40 of the drive block. As a result, when the tape 21 is slid downward in the vertical section of the track to open the window, the free end 39" of the drive arm 39 on the drive block engages the guide block side 52 to cause corresponding downward movement of the guide block while the rigid projections 55 by their engagement with the rigid shoulders 56 positively prevent disengagement of the drive connection provided by the drive arm. Alternatively, when the tape is slid upward in the vertical section of the track to close the window, the rigid drive foot 40 on the drive block engages the lower end 57 of the guide block to cause corresponding upward movement of the latter while the shoulder 39' of the drive arm is held out of engagement with the guide block side 53 and the rigid projections 55 by their engagement with the rigid shoulders 56 positively prevent disengagement of the drive connection provided by the drive foot.

Thus, the guide block 32 and drive block 30 are positively interlocked and the drive block is retained in engagement with the tape and this will be caused to occur by the rigid interlock means provided by projections 55 and shoulders 56 even with large tolerance stack-up conditions at the other mating surfaces of the drive block 30 and guide block 32 and slight set of the drive arm 39 so long as the tolerances are held close enough to establish the initial interfering snap acting movement of the drive arm followed, of course, by engagement of the interlock means.

Figure 2:
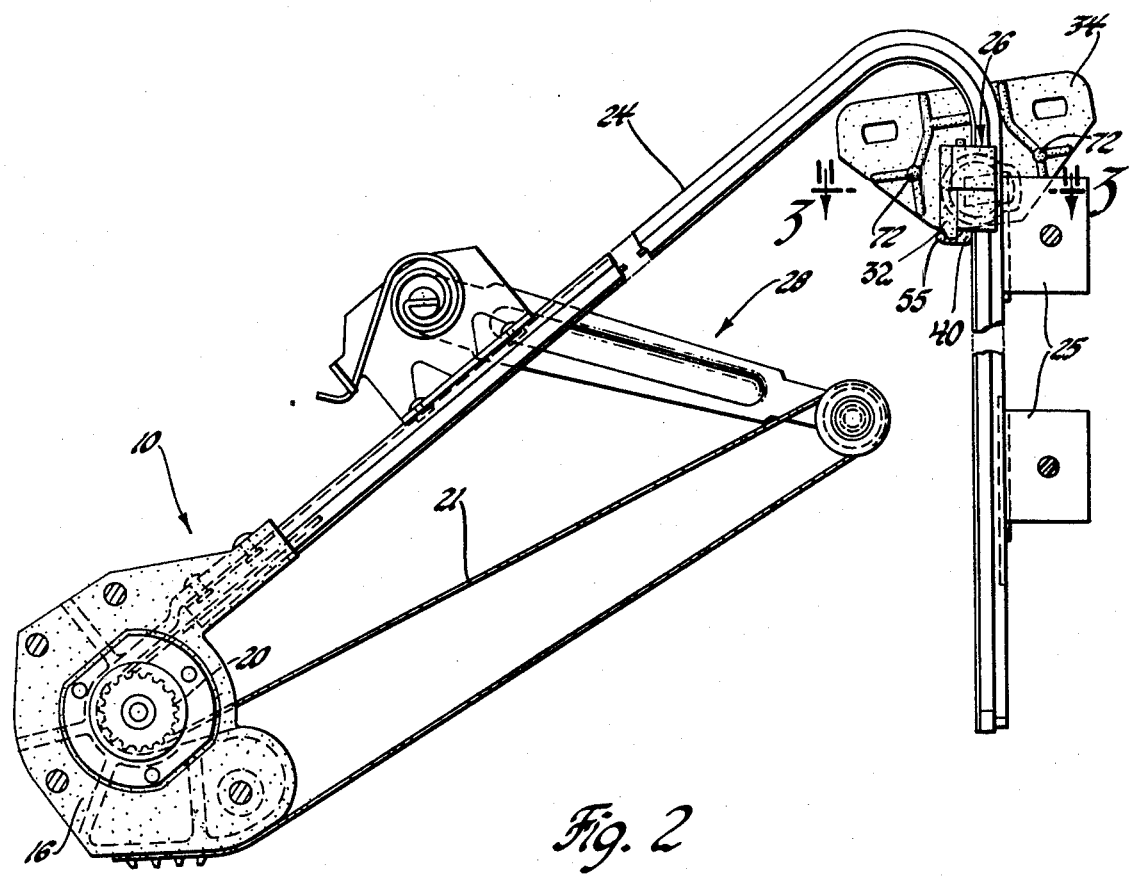
FIG. 2 is an enlarged view of the window regulator in FIG. 1.
Figure 3:
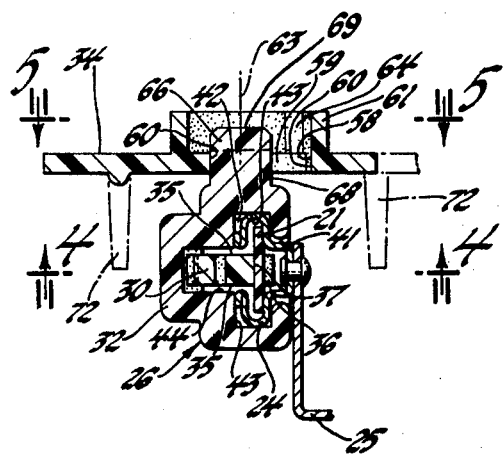
FIG. 3 is an enlarged view of the connector device taken along the line 3—3 in FIG. 2.

As shown in FIGS. 3, 5, and 6, the sash plate 34 has a slot 58 with a generally rectangular shape having parallel long flat sides 59 and cylindrical short concave sides 60. In addition, the sash plate is provided on one side with a projecting key-hole shaped collar 61 bordering the slot 58 having a cylindrical portion 62 with a center 63 centered with respect to one end of the slot and also having a slot portion 64 which is co-extensive with the other end of the slot. The guide block 32 has a T-shaped projection 66 comprising a cylindrical portion 68 and a pivot head 69 with flat sides 70 and cylindrical end portions 71 having a cross-section which conforms to that of the sash plate slot 58. The T-shaped projection 66 is insertable through the sash plate slot 58 from the side opposite the collar 61 and the sash plate 34 is then transversely movable relative to the T-shaped projection to align the center of the pivot head 69 with the center 63 of the cylindrical collar portion 62 whereupon the guide and sash parts are then turned or pivoted 90° relative to each other to thereafter provide interlocking therebetween by the long flat sides 70 of the pivot head being transverse to the long sides 59 of the sash plate slot while the cylindrical portions 71 are then pivotal about the center 63 in the cylindrical collar portion 62. In addition, a pair of projections 72 as best shown in FIGS. 2, 3 and 4 are formed on the sash plate in locations to extend on opposite sides of the channel track 24 with the sash plate assembled to the guide block to thereby limit pivoting of the sash plate relative to the guide block to prevent their disengagement prior to assembly of the sash plate to the window by conventional fasteners 74 as shown in FIG. 1.

Thus, the guide block and drive block are fixedly non-pivotally interlocked or interconnected with a snap-together connection and interlock arrangement which also retains engagement of the drive block with the tape while the guide block and sash plate are fixedly pivotally interlocked or interconnected by a twist lock connection with the latter interlock retained by cooperation of the sash plate with the channel track as a subassembly prior to connection of the sash plate to the window. As a result, very little time is required in connecting the regulator tape to the window. In addition, the interlocking means on the drive block, guide block and sash plate are all simple structures which permit these parts to each be easily molded in one-piece and thus readily suited for mass production.

The above described embodiment is illustrative of the invention which may be modified within the scope of the appended claims.

The embodiments of the invention in which an exclusive property or privilege is claimed are defined as follows:

1. In a tape drive window regulator having a tape slidably mounted in a fixed channel track, a drive block having teeth engaged with perforations in the tape, and a guide block slidably mounted on the track and also slidably engageable with the drive block for assembly therewith and wherein the guide block is drivingly connected to both the drive block and a window so as to effect opening and closing of the window as the tape is slid in opposite directions in the track, an improved drive connection arrangement between the drive and guide blocks comprising in combination: resilient drive means on one of the blocks for snapping into a position of drive engagement with the other block as the blocks are slidably engaged with each other during the assembly thereof to thereby effect a drive connection therebetween that is operable when the tape is slid in one direction in the track, rigid drive means on said one block for engaging with the other block to effect a drive connection therebetween that is operable when the tape is slid in the opposite direction in the track, and rigid interlock means on the blocks for engaging with each other to prevent disengagement of the drive connections provided by said resilient drive means and said rigid drive means and thereby maintain the blocks in their assembled condition.

2. In a tape drive window regulator having a tape slidably mounted in a fixed channel track, a drive block having teeth engaged with perforations in the tape, and a guide block slidably mounted on the track and also slidably engageable with the drive block for assembly therewith and wherein the guide block is drivingly connected to both the drive block and a window so as to effect opening and closing of the window as the tape is slid in opposite directions in the track, an improved drive connection arrangement between the drive and guide blocks comprising in combination: resilient drive means on the drive block for snapping into a position of drive engagement with the guide block as the blocks are slidably engaged with each other during the assembly thereof to thereby effect a drive connection therebetween that is operable when the tape is slid in one direction in the track, rigid drive means on the drive block for engaging with the guide block to effect a drive connection therebetween that is operable when the tape is slid in the opposite direction in the track, and rigid interlock means on the blocks for engaging with each other to prevent disengagement of the drive connections provided by said resilient drive means and said rigid drive means and thereby maintain the blocks in their assembled condition.

3. In a tape drive window regulator having a tape slidably mounted in a fixed channel track, a drive block having teeth engaged with perforations in the tape, and a guide block slidably mounted on the track and also slidably engageable with the drive block for assembly therewith and wherein the guide block is drivingly connected to both the drive block and a window so as to effect opening and closing of the window as the tape is slid in opposite directions in the track, an improved drive connection arrangement between the drive and guide blocks comprising in combination: a resilient arm integral with the drive block for snapping into a position of drive engagement with the guide block as the blocks are slidably engaged with each other during the assembly thereof to thereby effect a drive connection therebetween that is operable when the tape is slid in one direction in the track, a first rigid projection integral with the drive block for engaging with the guide block to effect a drive connection therebetween that is operable when the tape is slid in the opposite direction in the track, and a second rigid projection integral with and transverse to said first rigid projection for engaging with the drive block to prevent disengagement of the drive connections provided by said resilient arm and said first rigid projection and thereby maintain the blocks in their assembled condition.

* * * * *